Patented Feb. 8, 1949

2,460,805

UNITED STATES PATENT OFFICE 2,460,805

POLYMERIZATION OF ORGANO-POLYSILOXANES WITH ACID-ACTIVATED BLEACHING EARTH

Edgar C. Britton, Halbert C. White, and Clarence L. Moyle, Midland, Mich., assignors to The Dow Chemical Company, Midland, Mich., a corporation of Delaware No Drawing. Application December 6, 1945, Serial No. 633,258

8 Claims. (Cl. 260—46.5)

This invention relates to organo-siloxane polymers of high molecular weight, and to an improved method for their preparation from lower organo-siloxane polymers.

It is known that when an organo-siloxane polymer of low molecular weight is heated in contact with a minor amount of a mineral acid, e. g. sulfuric acid or phosphoric acid, the polymer increases in molecular weight and the material becomes more viscous.

As the reaction progresses, efficient agitation of the mixture becomes increasingly difficult, and the acid, originally finely dispersed in the organo-siloxane polymer, tends to agglomerate into larger droplets. Consequently, the reaction mixture frequently is lacking in uniformity and repeated production of a product of given quality is difficult. Moreover, it is often difficult to arrest the process at the proper moment, and to remove the bulk of the acid with sufficient rapidity to prevent continued polymerization.

We have discovered that polymerization processes of the type discussed above may be efficiently and satisfactorily conducted by employing an acid-activated bleaching earth as the acid catalyst for the reaction. The earth is readily maintained in uniform dispersion throughout the liquid organo-siloxane, and at any time may be conveniently and completely removed by mechanical means, e. g. filtration. The bleaching earths which, in acid-activated form, are preferred are porous earths or clays having a large surface area per unit of weight, such as Florida earth, Kambara earth, bentonite, or other hydrous aluminum silicates, etc.

The bleaching earth may be impregnated with as much or as little mineral acid as desired, before use as a catalyst in this invention. Thus, for example, it may be washed with acid, dried at a temperature of approximately 100° C., or higher, then comminuted to the desired degree of fineness. It frequently is advantageous to impregnate the bleaching earth with as much acid as the earth will adsorb, before dispersion in the organo-siloxane starting material. It has been found that bleaching earths will, in many instances, take up approximately their own weight of sulfuric acid, and after drying at approximately 100° C., be sufficiently friable to permit comminution to a fine, dry powder, which is easily handled and does not deteriorate on storage.

In practice, the organo-siloxane starting material is brought into contact with an acid-activated bleaching earth at an elevated temperature, e. g. from 50° to 300° C. or thereabout. A diluent such as toluene, dioxane, etc., may also be added, but is not required. For example, the earth in a finely divided form may be dispersed in the liquid organo-siloxane polymers, and the resultant mixture warmed with stirring, until the viscosity of the product has attained a predetermined value, indicative of the desired degree of polymerization. Usually, from 0.2 to 5.0 parts by weight of acid-activated bleaching earth are employed per 100 parts of organo-siloxane polymer, although greater or lesser proportions of the catalyst may also be used. The optimum temperature varies, of course, with the organo-siloxane starting material, but usually lies within the range of from 50° to 300° C. The reaction mixture is subsequently cooled, and the catalyst removed by filtration, or other mechanical means. It is sometimes advantageous to dilute the reaction mixture with an inert diluent, e. g. toluene, prior to filtration. The organo-siloxane polymer obtained by the method just described, is substantially free of acid and other contaminants, which are adsorbed and retained in the bleaching earth.

The process of polymerization of this invention is applicable to any liquid organo-siloxane polymer which may be further polymerized by treatment with a mineral acid, such as sulfuric acid, phosphoric acid, etc. Our process is of particular advantage for the treatment of organo-siloxane polymers of relatively low molecular weight, e. g. polymers containing less than ten silicon atoms in the molecule, to produce polymers of much greater molecular weight. It permits ready control of the polymerization reaction to produce a product of desired body, or viscosity, and repeated production of a given quality of product.

The following examples describe certain ways in which the principle of the invention has been applied, but are not to be construed as limiting the invention:

Example 1

A liquid condensation product comprised essentially of a mixture of dimethyl-siloxane polymers was filtered through a bed of Retrol (an acid-activated clay) while maintaining said bed at a temperature of approximately 100° C. A thin, mobile gel was obtained.

Example 2

This example illustrates the preparation of a catalyst containing approximately 50 per cent by weight of sulfuric acid. Approximately 100 grams of Retrol and 250 grams of concentrated sulfuric acid were mixed with stirring until uniformly blended. The resultant slurry was filtered through a glass cloth, whereby the excess acid was separated. The residual cake-like mass was heated for four hours at 150° to 160° C. After cooling, the product was easily crushed to a dry powder. The yield of acidic catalyst was 206 grams.

*Example 3*

A mixture consisting for the most part of phenyl ethyl dichlorosilane, and containing minor amounts of phenyl and ethyl chlorosilanes, was reacted with water and the polymeric product collected and washed free of acid. A liquid was obtained which had a viscosity of approximately 3 centipoises as determined at 20° C. in a 50 per cent by weight solution in toluene.

To 100 parts by weight of the liquid polymeric product was added approximately one part of powdered catalyst as prepared in Example 2. The mixture was heated at approximately 200° C. while passing in steam. At the end of 6.5 hours the mixture had set to a firm, solid gel.

*Example 4*

To 250 parts by weight of a mixture of liquid phenyl-ethyl-siloxane polymers similar to that employed in Example 3, was added with stirring, 1.0 part of a catalyst prepared as in Example 2. The mixture was heated at a temperature of approximately 200° C. and steam was passed into the reaction mixture, with stirring. At the end of 28 hours, the product was diluted with toluene and the catalyst removed by filtration. The viscosity of the mixture of phenyl-ethyl-siloxane polymers had increased from an initial value of approximately 3.2 centipoises to 25.2 centipoises, as determined at 20° C., in a 50 per cent by weight solution in toluene.

*Example 5*

To 350 parts by weight of a mixture of liquid phenyl-ethyl-siloxane polymers, similar to the starting material employed in Example 3, was added with stirring one part of catalyst prepared as in Example 2. Steam was passed into the reaction mixture while maintaining the latter at a temperature of approximately 200° C. After 95 hours, the reaction product was diluted with toluene and filtered. The viscosity of the mixture of phenyl-ethyl-siloxane polymers had increased from approximately 3.2 centipoises to 45 centipoises as determined in a 50 per cent solution at 20° C.

Other modes of applying the principle of the invention may be employed instead of those explained, change being made as regards the compounds and materials herein disclosed, provided the steps or compounds stated by any of the following claims or equivalent of such steps or compounds be employed.

We therefore particularly point out and distinctly claim as our invention:

1. In the condensation of organo-siloxane polymers to form polymers of higher molecular weight, the step which comprises contacting a liquid hydrocarbon substituted siloxane polymer with an acid-activated bleaching earth at a reaction temperature between 50° and 300° C. to effect further polymerization of the hydrocarbon substituted siloxane.

2. The process which comprises contacting an acid-activated bleaching earth with a liquid hydrocarbon substituted siloxane polymer, maintaining the mixture at a reaction temperature between 50° and 300° C. and recovering an hydrocarbon substituted siloxane polymer of higher molecular weight than that initially employed.

3. The process which comprises contacting an acid-activated bleaching earth with a liquid hydrocarbon substituted siloxane polymer, maintaining the mixture at a temperature of from 100° to 250° C., and recovering an hydrocarbon substituted siloxane polymer of higher molecular weight than that initially employed.

4. The process which comprises contacting an acid-activated bleaching earth with a liquid organo-siloxane polymer containing, as the organic portions of the molecule, phenyl and ethyl radicals attached directly to the silicon atoms, maintaining the mixture at a temperature of from 100° to 250° C., and recovering an organo-siloxane polymer of higher molecular weight than that of the starting material.

5. A method which comprises forming a mixture of a liquid hydrocarbon substituted siloxane polymer and a minor amount of an acid-activated bleaching earth, and heating the mixture at reaction temperatures between 50° and 300° C., whereby the hydrocarbon substituted siloxane polymer is caused to react with formation of an hydrocarbon substituted siloxane polymer of higher molecular weight.

6. A method which comprises passing steam through a mixture of a liquid hydrocarbon substituted siloxane polymer and a minor amount of an acid-activated bleaching earth while heating the mixture at reaction temperatures between 100° and 250° C., and thereafter recovering from the mixture an hydrocarbon substituted siloxane polymer of molecular weight higher than that of the hydrocarbon substituted siloxane initially employed.

7. A method which comprises passing steam through a mixture of a liquid hydrocarbon substituted siloxane polymer and a minor amount of a bleaching earth having sulfuric acid admixed therewith, while heating the mixture at reaction temperatures between 100° and 250° C., and thereafter recovering from the mixture an hydrocarbon substituted siloxane polymer of molecular weight higher than that of the hydrocarbon substituted siloxane polymer initially employed.

8. A method which comprises passing steam through a mixture of a liquid phenyl ethyl siloxane polymer and a minor amount of a bleaching earth having sulfuric acid admixed therewith, while heating the mixture at reaction temperatures between 100° and 250° C., and thereafter recovering from the mixture a phenyl ethyl siloxane polymer of molecular weight higher than that of the phenyl ethyl siloxane polymer initially employed.

EDGAR C. BRITTON.
HALBERT C. WHITE.
CLARENCE L. MOYLE.

REFERENCES CITED

The following references are of record in the file of this patent:

UNITED STATES PATENTS

| Number | Name | Date |
|---|---|---|
| 2,200,763 | Anderson et al. | May 14, 1940 |
| 2,371,068 | Rochow | Mar. 6, 1945 |